(12) United States Patent
Bobick et al.

(10) Patent No.: US 11,113,304 B2
(45) Date of Patent: Sep. 7, 2021

(54) TECHNIQUES FOR CREATING COMPUTER GENERATED NOTES

(71) Applicant: MAKE SENCE, INC., Road Town (VG)

(72) Inventors: Mark Bobick, Indialantic, FL (US); Carl Wimmer, Guadalajara (MX)

(73) Assignee: MAKE SENCE, INC.

( * ) Notice: Subject to any disclaimer, the term of this patent is extended or adjusted under 35 U.S.C. 154(b) by 308 days.

(21) Appl. No.: 15/944,686

(22) Filed: Apr. 3, 2018

(65) Prior Publication Data

US 2019/0079983 A1  Mar. 14, 2019

Related U.S. Application Data

(63) Continuation of application No. 14/964,960, filed on Dec. 10, 2015, now abandoned, which is a continuation of application No. 13/225,638, filed on Sep. 6, 2011, now Pat. No. 9,213,689, which is a continuation of application No. 11/761,839, filed on Jun. 12, 2007, now Pat. No. 8,024,653, said
(Continued)

(51) Int. Cl.
| | |
|---|---|
| *G06F 16/25* | (2019.01) |
| *G06F 16/93* | (2019.01) |
| *G06F 16/951* | (2019.01) |
| *G06F 16/955* | (2019.01) |
| *G06N 5/02* | (2006.01) |
| *G06F 40/20* | (2020.01) |
| *G06F 40/247* | (2020.01) |
| *G06F 40/258* | (2020.01) |
| *G06F 40/284* | (2020.01) |

(52) U.S. Cl.
CPC ............ *G06F 16/258* (2019.01); *G06F 16/93* (2019.01); *G06F 16/951* (2019.01); *G06F 16/955* (2019.01); *G06F 40/20* (2020.01); *G06F 40/247* (2020.01); *G06F 40/258* (2020.01); *G06F 40/284* (2020.01); *G06N 5/022* (2013.01)

(58) Field of Classification Search
CPC .................................................. G06F 16/258
USPC ....................................................... 707/736
See application file for complete search history.

(56) References Cited

U.S. PATENT DOCUMENTS

| | | | | |
|---|---|---|---|---|
| 2002/0198701 A1* | 12/2002 | Moore | .................... | G06F 40/45 704/2 |
| 2003/0041304 A1* | 2/2003 | Numata | .................. | G06F 16/86 715/234 |

(Continued)

*Primary Examiner* — Syling Yen
(74) *Attorney, Agent, or Firm* — MH2 Technology Law Group LLP

(57) ABSTRACT

Text is extracted from and information resource such as documents, emails, relational database tables and other digitized information sources. The extracted text is processed using a decomposition function to create. Nodes are a particular data structure that stores elemental units of information. The nodes can convey meaning because they relate a subject term or phrase to an attribute term or phrase. Removed from the node data structure, the node contents are or can become a text fragment which conveys meaning, i.e., a note. The notes generated from each digital resource are associated with the digital resource from which they are captured. The notes are then stored, organized and presented in several ways which facilitate knowledge acquisition and utilization by a user.

20 Claims, 10 Drawing Sheets

Related U.S. Application Data application No. 14/964,960 is a continuation-in-part of application No. 11/314,835, filed on Dec. 21, 2005, now Pat. No. 8,126,890, and a continuation-in-part of application No. 11/273,568, filed on Nov. 14, 2005, now Pat. No. 8,108,389.

(60) Provisional application No. 60/804,495, filed on Jun. 12, 2006.

(56) References Cited

U.S. PATENT DOCUMENTS

| | | | | |
|---|---|---|---|---|
| 2003/0050927 | A1* | 3/2003 | Hussam | G06F 16/904 |
| 2004/0205737 | A1* | 10/2004 | Margaliot | G06F 40/211 |
| | | | | 717/143 |
| 2005/0257140 | A1* | 11/2005 | Marukawa | G06F 40/117 |
| | | | | 715/255 |
| 2005/0278325 | A1* | 12/2005 | Mihalcea | G06F 16/3344 |

* cited by examiner

FIGURE 9

| PRECIOUS | ARE | METALS |
|---|---|---|
| PRECIOUS | IS | GOLD |
| GOLD | SETS | STANDARD |
| GOLD | IS | STANDARD |
| METALS | SET | STANDARD |
| STANDARD | FOR | VALUE |

SAVE SELECTED
181A

SAVE ALL
181B

EMAIL
181C

PRINT
181D

NOTE 160

NOTE SELECTION WINDOW 176

FIGURE 10A

| NOTE 160B | | | | |
|---|---|---|---|---|
| NOTE CONTENT 161 | "GOLD" | INSERTED SPACE | "IS" | INSERTED SPACE | "STANDARD" |
| NOTE SOURCE 162 | www.goldreserve.com | | | |

FIGURE 10B

| QUOTATION NODE 1010 | |
|---|---|
| QUOTE 1013 | "Ask not what your country can do for you. Ask what you can do for your country." |
| SEQUENCE 1088 | www.uspresidents.com |

TECHNIQUES FOR CREATING COMPUTER GENERATED NOTES

CROSS REFERENCE TO RELATED APPLICATIONS

This application is a continuation of pending application Ser. No. 16/964,960, filed on Dec. 10, 2015, which is a continuation of application Ser. No. 13/225,638, filed on Sep. 6, 2011, now U.S. Pat. No. 9,213,689, which is a continuation of application Ser. No. 11/761,839, filed on Jun. 12, 2007, now U.S. Pat. No. 8,024,653, which claims priority to provisional application Ser. No. 60/804,495, filed Jun. 12, 2006, and is also a continuation-in-part of patent Ser. No. 11/314,835, filed Dec. 21, 2005, now U.S. Pat. No. 8,126,890 and is a continuation-in-part of application Ser. No. 11/273,568, filed Nov. 14, 2005, now U.S. Pat. No. 8,108,389, the contents of each of which are hereby incorporated into this application by reference in their entirety.

BACKGROUND OF THE INVENTION

Field of the Invention

The invention is related to information technology and, more particularly, to the use of computer generated notes to improve comprehension and utilization of digitized information.

Description of Related Art

Note taking is a basic function of human knowledge acquisition from printed or digitized information sources, familiar to every student, professional, or worker who must select words or phrases of interest from a page or a document. Like the manual process of note taking, computer-facilitated or computer-automated implementations of note taking—including the current invention—all produce value to a user by distillation and/or reduction of the original text of a document into a form more readily managed by a user. The user may perform or seek the reduction and/or distillation of a page or document for the purposes of review and study—or for the purpose of correlating the resulting notes together to produce facts, assertions and conclusions. While notes generated by a human note taker may sometimes be phrases, sentences or paragraphs captured or paraphrased specifically to be quoted elsewhere, manual note taking for the purpose of knowledge acquisition typically aims to capture from a page or document some fragments which convey meaning—the fragments having a significance subjectively determined by a user. Alternatively, the user may seek only a more or less minimal description of what the document or page "is about". A number of software program products have been developed over time to assist and facilitate the note taking function.

Manual note taking for the purpose of creating and publishing study guides is familiar to every student. In the United States, Cliffs Notes (a product of Wiley Publishing, Inc.) are fixtures of secondary school homework regimes.

Document summarization is related to note taking in that the summarization function attempts to distill the contents of a page or document into a paraphrased form which is ideally of the minimum word length while including the maximum of the page or document's relevant content. Academic and commercial attention to page and document summarization has increased over recent years, especially as part of the effort to improve internet search. Text summarization is difficult, computationally expensive, and requires extremely sophisticated algorithms operating upon extensive supporting semantic, lexical and database infrastructure. Because of these factors, true text summarization is not yet considered practical. "Extractor" (a product of DBI Technologies, Inc. of Canada) illustrates the current limitations of the technology.

Many so-called note taking software products currently available are used as a simple means to capture, store, and organize the text fragment notes generated by the user while reviewing documents, web pages, or other material—either digitized or printed. An example is MagicNotes (a product of Rose City Software, Inc.). Other products capture some or all of digitized source page or document, but require the user to edit out any unwanted material. An example is Zoot (a product of Zoot Software, Inc.). In this group of software products that capture, store and organize user generated or user edited notes, the most sophisticated is Questia, (a product of Questia Media America, Inc.). Questia is an online research and library service with an extensive user interface that presents each page of a user selected digitized reference (such as a digitized encyclopedia) to the user. The user can then highlight and capture as a note any text fragment, phrase, paragraph or larger text fragment and store that fragment in an online project folder, preserving the location from which the fragment was copied. Questia then supports composition of research papers by allowing the easy pasting of the captured text fragments into a document, and then automatically generating and placing correctly formed bibliographic references.

The present invention automatically generates notes from a page or document—or from any other digitized information source. None of the currently available products is able to do so. Further, as described more hereinafter, the novel features and uses of the present invention optimize the utility of the generated notes.

BRIEF SUMMARY OF THE INVENTION

The present invention discloses a method and apparatus for utilizing the nodes generated by the decomposition function described more hereinafter and in said Ser. No. 11/273,568 as notes. A decomposition function creates nodes from documents, emails, relational database tables and other digitized information sources. Nodes are a particular data structure that stores elemental units of information. The nodes can convey meaning because they relate a subject term or phrase to an attribute term or phrase. Removed from the node data structure, the node contents take the form of a text fragment which conveys meaning, i.e., a note. The notes generated from each digital resource are associated with the digital resource from which they are captured. The notes are then stored, organized and presented in several ways which facilitate knowledge acquisition and utilization by a user.

BRIEF DESCRIPTION OF THE DRAWINGS

FIG. 9 is an illustration of an exemplary screen view of a note selection window and related control buttons in accordance with one aspect of the invention.

FIG. 10A illustrates the contents of a note created from a four-part node in accordance with one aspect of the invention.

FIG. 10B illustrates the contents of a quotation node in accordance with one aspect of the invention.

DETAILED DESCRIPTION OF THE INVENTION

Figure 1:
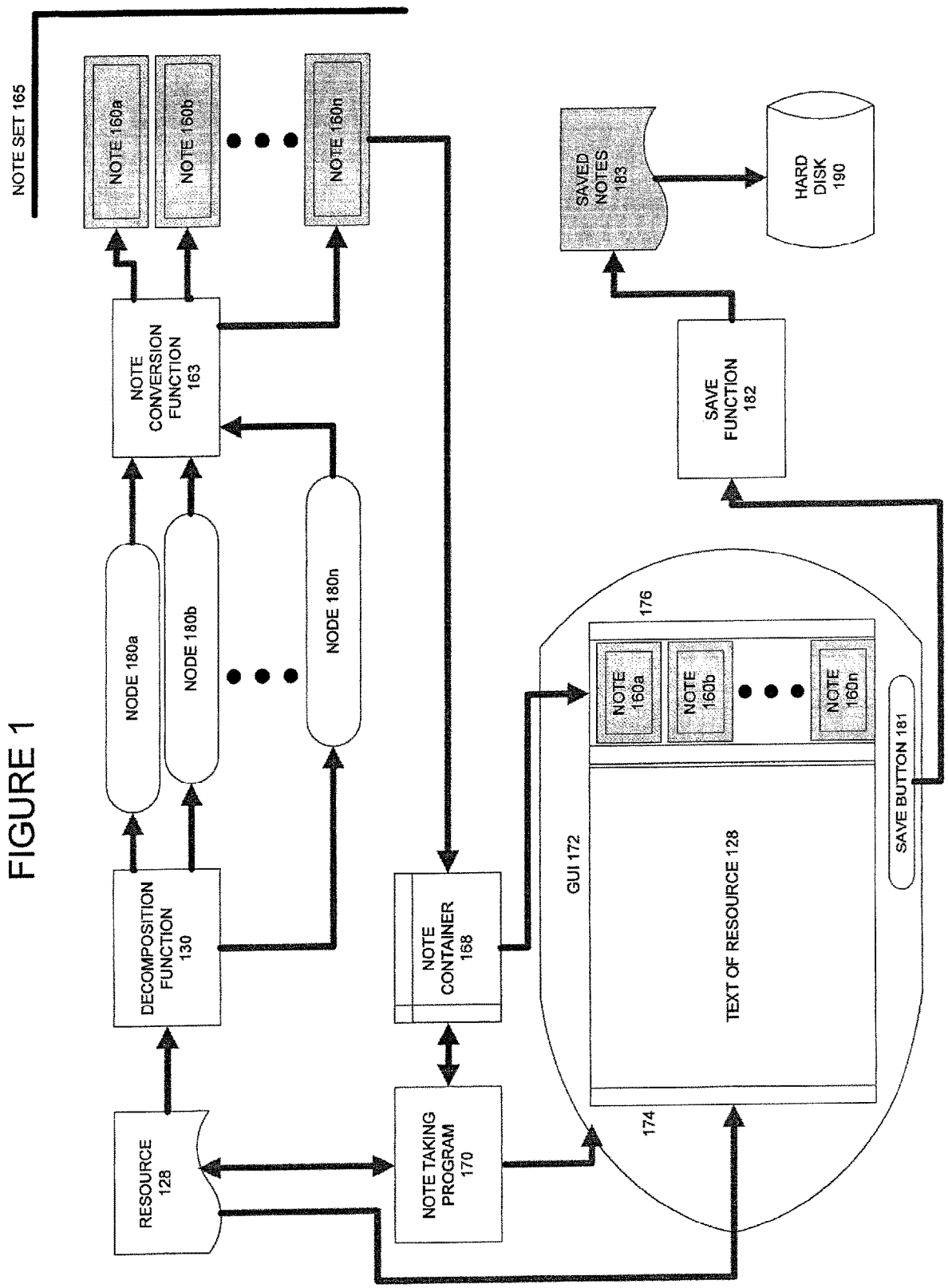
FIG. 1 is a functional diagram of a computer generated note taking system in accordance with one aspect of the invention.

FIG. 1 is a flow chart of the process by which the nodes generated by the decomposition function described in said Ser. No. 11/273,568 are converted into notes and then stored, organized, and presented to the user in accordance with one preferred embodiment of the invention. A digital resource 128 is input to a decomposition function 130, generating nodes 180a-180n as described hereinafter and in said Ser. No. 11/273,568 and said Ser. No. 11/314,835. The nodes are self contained and require nothing else to convey meaning. Referring once again to FIG. 1, the contents of each generated node 180 is extracted and converted into a note 160 by a note conversion function 163. A note 160 is a text object. All notes 160a-160n generated from the same digital resource 128 or discrete part thereof are together referred to as a note set 165. The note set 165 is placed in a note container 168, which is a data structure suitable for storing notes 160a-160n and associating a note set 165 with the digital resource 128 from which the notes 160a-160n were generated.

When the note set 165 is complete all notes 160a-160n are placed into the note container 168 by the note conversion function 163.

Figure 2:
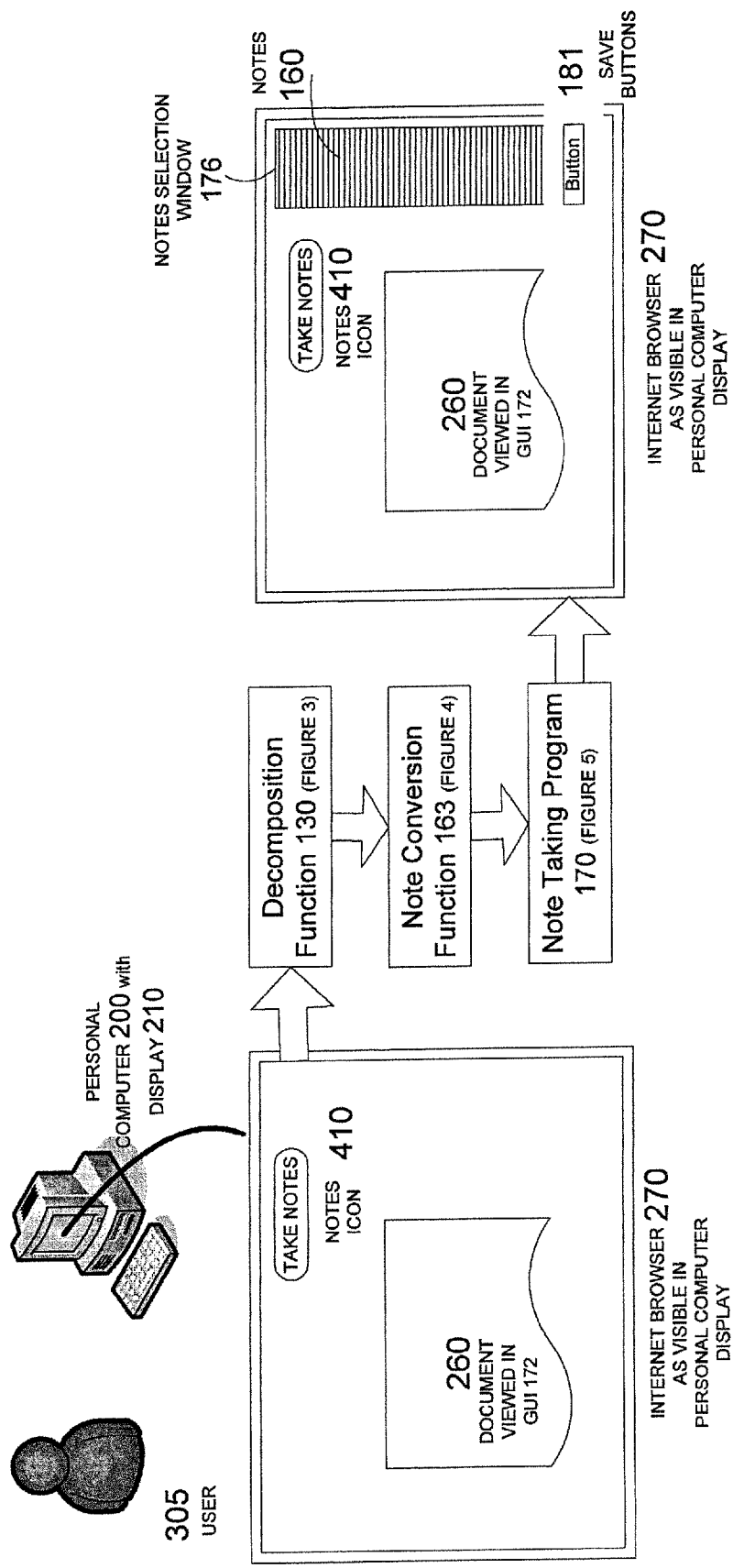
FIG. 2 is a high-level diagram showing how a user interacts with the system for computer generation of notes in accordance with one aspect of the invention.

FIG. 2 is a high-level diagram showing how a user interacts with the system for computer generation of notes in accordance with one aspect of the invention. In FIG. 2, user 305 utilities a personal computer 200 with a display 210 to view a graphical user interface (172 of FIG. 1) which displays the text of the resource 128 in a document window 260. The document window 260 is displayed on the display 210 in a window 270 for viewing using, e.g., an Internet browser. On the browser screen, in addition to the document 260, there is a "take notes" button 410 preferably in the shape of a notes icon. When the user selects or otherwise activates the notes icon, the text of the resource 128 is extracted and passed to a decomposition function 130 which is shown more in detail in conjunction with FIG. 3. The decomposition function then passes the output, described hereinafter, to a note conversion function 163, more particularly described in conjunction with FIG. 4.

A note taking program 170 then receives the output of the note conversion function 163 and displays the document 260 in the window together with a notes selection window 176 containing notes 160 and with one or more save notes buttons 181.

Figure 3:
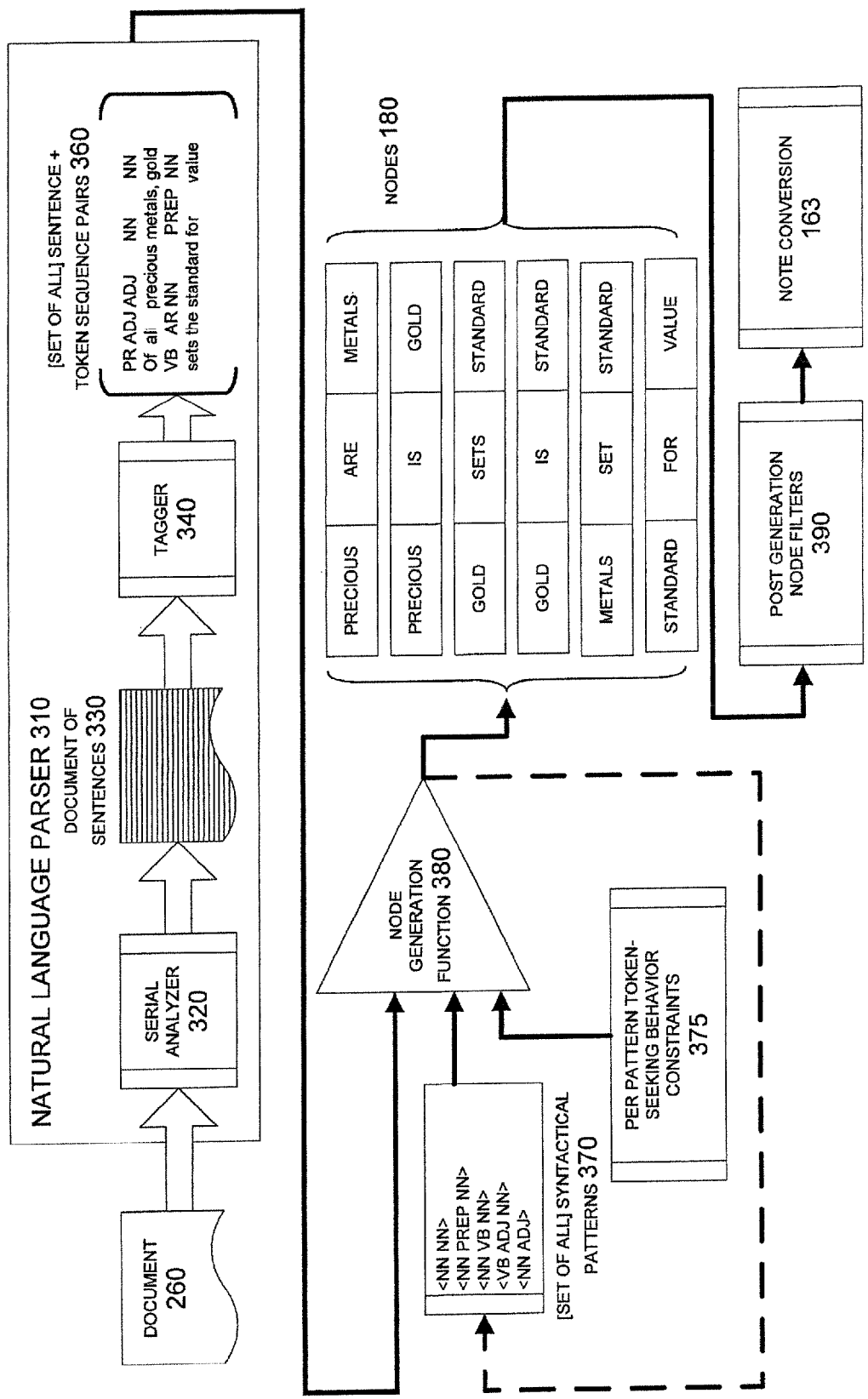
FIG. 3 is a block diagram showing the decomposition function of FIG. 1 in accordance with one aspect of the invention.

FIG. 3 is a block diagram showing the decomposition function of FIG. 1 in accordance with one aspect of the invention. The diagram is a somewhat simplified illustration of the document decomposition Function 130. A Document 260 is first subjected to processing by specific components of a Natural Language Parser 310. Although there a number of Natural Language Parsers 310 available, and all available Natural Language Parsers 310 have widely differing implementations, one well known example is part of the GATE Natural Language Processor. GATE stands for "General Architecture for Text Engineering" and is a project of the University of Sheffield in the United Kingdom. GATE has a very large number of components, most of which have no bearing upon the present invention. One embodiment of the current invention utilizes a small subset of GATE components—a Serial Analyzer (called the "ANNIE Serial Analyzer") 320, a Document of Sentences 330, a Tagger (called the "Hepple Tagger") 340—to extract Sentence+Token Sequence Pairs 360. It is the Sentence+Token Sequence Pairs 360 that are utilized by the Document Decomposition Function 130.

The set of Sentence+Token Sequence Pairs 360 are produced in GATE as follows: The Serial Analyzer 320 extracts "Sentences" from an input Document 260. The "Sentences" do not need to conform to actual sentences in an input text, but often do. The sentences are "aligned" in a stack termed a Document of Sentences 330. Each Sentence in the Document of Sentences 330 is then run through the Tagger 340 which assigns to each word in the Sentence a part of speech token. The parts of speech are for the most part the same parts of speech well known to school children, although among Taggers 340, there is no standard for designating tokens. In the Hepple Tagger, a singular Noun is assigned the token "NN", an adjective is assigned the token "JJ", an adverb is assigned the token "RB" and so on. Sometimes, additional parts of speech are created for the benefit of downstream uses. In the described embodiment, the Hepple Tagger 340 created part of speech "TO" is an example. The part of speech tokens are maintained in a token sequence which is checked for one-to-one correspondence with the actual words of the sentence upon which the token sequence is based. The Sentence+Token Sequence Pair 760 is then presented to the Node Generation Function 380.

A significant element of the present invention are novel Patterns of Tokens ("Patterns") 370 and Per-Pattern Token Seeking Behavior Constraints ("Constraints") 375 which are applied to the Sentence+Token Sequence Pair 360 within the Node Generation Function 380 to produce Nodes 180, where such Nodes 180 are specifically intended to be converted into Notes 160, where said Notes 160 conform—with specific exceptions—to notes composed by hand and ad hoc by a human reviewer of the underlying Document 260, and where the set of said Notes 160 represents—with specific exceptions—an exhaustive extraction of all knowledge from said Document 260.

There are several uses for part of speech patterns and token seeking rules documented in the literature of Information Extraction, the domain with which the current invention is associated, and in the related field of Information Retrieval. Text analysis for the purpose of automated document classification or indexing for search engine-based retrieval is a primary use of part of speech patterns. Part of speech patterns and token seeking rules are used in text analysis to discover keywords, phrases, clauses, sentences, paragraphs, concepts and topics. Although the meanings of keyword, clause, sentence, and paragraph conform to the common understanding of the terms, the meanings of phrase, concept, and topic varies by implementation. Sometimes, the word phrase is defined using its traditional meaning in grammar. In this use, types of phrases include Prepositional Phrases (PP), Noun. Phrases (NP), Verb Phrases (VP), Adjective Phrases, and Adverbial Phrases. For other implementations, the word phrase may be defined as any proper name (for example "New York City"). Most definitions require that a phrase contain multiple words, although at least one definition permits even a single word to be considered a phrase. Some search engine implementations utilize a lexicon (a pre-canned list) of phrases. The WordNet Lexical Database is a common source of phrases. The Notes 160 generated by the preset invention can not be classified as keywords, phrases, clauses, or sentences (or any larger text unit) using the well known definitions of these terms, except by serendipitous execution of the described functions.

The word concept generally refers to one of two constructs. The first construct is concept as a cluster of related words, similar to a thesaurus, associated with a keyword. In a number of implementations, this cluster is made available to a user—via a Graphic User Interface (GUI) for correction and customization. The user can tailor the cluster of words until the resulting concept is most representative of the user's understanding and intent. The second construct is concept as a localized semantic net of related words around a keyword. Here, a local or public ontology and taxonomy is consulted to create a semantic net around the keyword. Some implementations of concept include images and other non-text elements. Topics in general practice need to be identified or "detected" from a applying a specific set of operations against a body of text. Different methodologies for identification and/or detection of topics have been described in the literature. The Notes 160 generated by the current invention can not be classified as concepts or topics using the well know definitions of these terms, except by serendipitous execution of the described functions.

In the prior art, necessary use of part of speech pattern examination is applied within the boundaries of an individual text (intralinguistic), to resolve endophoric ambiguity. For example, in the text, "I had a professor who always carried an umbrella. He never opened it even when it rained.", the second sentence is endophora because it refers to something (the professor) who was mentioned earlier in the text but is not clearly named in the second sentence. Likewise, one "it" in the second sentence refers to "umbrella" in the first sentence. For those applications which require determining what a document "is about", such use of part of speech patterns is critical. A token seeking rule which might be applied in this case—when processing the second sentence—might be to "go back" to find the noun in the first sentence to which the "He" (or the "it") in the second sentence applies. The Constraints 375 described herein do not mirror the token seeking rules present in the prior art except in the most abstract of characteristics. The Constraints 375 can not be used to identify keywords, phrases, clauses, sentences, concepts or topics. The Patterns 370 crafted for the present invention can not be used to identify keywords, phrases, clauses, sentences, concepts or topics in the formally accepted structures of instantiations of those terms. Further, the Patterns 370 and Constraints 375 required for the current invention differ from those required for Ser. No. 11/273,568 and Ser. No. 11/314,835. The fundamental difference is that the Pattern 370 and Constraints 375 are designed and intended to produce optimally correlatable Nodes 180, such Nodes 180 ideally capturing a Relation (value of Bond 184) between the values of Subject 182 and Attribute 186. The present invention sets no such standard for Node 180 creation, but instead, establishes Patterns 370 and Constraints 375 which can ultimately produce Notes 160 at machine speed.

The two methods of resource decomposition applied in current embodiments of the present invention are word classification and intermediate format. Word classification identifies words as instances of parts of speech (e.g. nouns, verbs, adjectives). Correct word classification often requires a text called a corpus because word classification is dependent upon not what a word is, but how it is used. Although the task of word classification is unique for each human language, all human languages can be decomposed into parts of speech. The human language decomposed by word classification in the preferred embodiment is the English language, and the means of word classification is a natural language parser (NLP) (e.g. GATE, a product of the University of Sheffield, UK). In one embodiment,
  (a) text is input to the NLP;
  (b) the NLP restructures the text into a "document of sentences";
  (c) for each "sentence",
    (c1) the NLP encodes a sequence of tokens, where each token is a code for the part of speech of the corresponding word in the sentence.

Where the resource contains at least one formatting, processing, or special character not permitted in plain text, the method is:
  (a) text is input to the NLP;
  (b) the NLP restructures the text into a "document of sentences";
  (c) for each "sentence",
    (c1) the NLP encodes a sequence of tokens, where each token is a code for the part of speech of the corresponding word in the sentence.
    (c2) characters or words that contain characters not recognizable to the NLP are discarded from both the sentence and the sequence of tokens.

By using this second method, resources containing any English language text may be decomposed into nodes, including resources formatted as:
  (i) text (plain text) files.
  (ii) Rich Text Format (RTF) (a standard developed by Microsoft, Inc.). An alternative method is to first obtain clean text from RTF by the intermediate use of a RTF-to-text conversion utility (e.g. RTF-Parser-1.09, a product of Pete Sergeant).
  (iii) Extended Markup Language (XML) (a project of the World Wide Web Consortium) files as described more immediately hereinafter.
  (iv) any dialect of markup language files, including, but not limited to: HyperText Markup Language (HTML) and Extensible HyperText Markup Language (XHTML™) (projects of the World Wide Web Consortium), RuleML (a project of the RuleML Initiative), Standard Generalized Markup Language (SGML) (an international standard), and Extensible Stylesheet Language (XSL) (a project of the World Wide Web Consortium) as described more immediately hereinafter.
  (v) Portable Document Format (PDF) (a proprietary format of Adobe, Inc.) files (by means of the intermediate use of a PDF-to-text conversion utility).
  (vi) MS WORD files e.g. DOC files used to store documents by MS WORD (a word processing software product of Microsoft, Inc.) This embodiment programmatically utilizes a MS Word-to-text parser (e.g. the Apache POI project, a product of Apache.org). The POI project API also permits programmatically invoked text extraction from Microsoft Excel spreadsheet files (XLS). An MS Word file can also be processed by a NLP as a plain text file containing special characters, although XLS files can not.

(vii) event-information capture log files, including, but not limited to: transaction logs, telephone call records, employee timesheets, and computer system event logs.

(viii) web pages (ix) blog pages

For decomposition XML files by means of word classification, decomposition is applied only to the English language content enclosed by XML element opening and closing tags with the alternative being that decomposition is applied to the English language content enclosed by XML element opening and closing tags, and any English language tag values of the XML element opening and closing tags. This embodiment is useful in cases of the present invention that seek to harvest metadata label values in conjunction with content and informally propagate those label values into the nodes composed from the element content. In the absence of this capability, this embodiment relies upon the XML file being processed by a NLP as a plain text file containing special characters. Any dialect of markup language files, including, but not limited to: HyperText Markup Language (HTML) and Extensible HyperText Markup Language (XHTML™) (projects of the World Wide Web Consortium), RuleML (a project of the RuleML Initiative), Standard Generalized Markup Language (SGML) (an international standard), and Extensible Stylesheet Language (XSL) (a project of the World Wide Web Consortium) is processed in essentially identical fashion by the referenced embodiment.

Email messages and email message attachments are decomposed using word classification in a preferred embodiment of the present invention. As described earlier, the same programmatically invoked utilities used to access and search email repositories on individual computers and servers are directed to the extraction of English language text from email message and email attachment files. Depending upon how "clean" the resulting extracted English language text can be made, the NLP used by the present invention will process the extracted text as plain text or plain text containing special characters. Email attachments are decomposed as described earlier for each respective file format.

Decomposition by means of word classification being only one of two methods for decomposition supported by the present invention, the other means of decomposition is decomposition of the information from a resource using an intermediate format. The intermediate format is a first term or phrase paired with a second term or phrase. In a preferred embodiment, the first term or phrase has a relation to the second term or phrase. That relation is either an implicit relation or an explicit relation, and the relation is defined by a context. In one embodiment, that context is a schema. In another embodiment, the context is a tree graph. In a third embodiment, that context is a directed graph (also called a digraph). In these embodiments, the context is supplied by the resource from which the pair of terms or phrases was extracted. In other embodiments, the context is supplied by an external resource. In accordance with one embodiment of the present invention, where the relation is an explicit relation defined by a context, that relation is named by that context.

In an example embodiment, the context is a schema, and the resource is a Relational Database (RDB). The relation from the first term or phrase to the second term or phrase is an implicit relation, and that implicit relation is defined in an RDB. The decomposition method supplies the relation with the pair of concepts or terms, thereby creating a node. The first term is a phrase, meaning that it has more than one part (e.g. two words, a word and a numeric value, three words), and the second term is a phrase, meaning that it has more than one part (e.g. two words, a word and a numeric value, three words).

The decomposition function takes as input the RDB schema. The method includes:

(A) A first phase, where
  (a) the first term or phrase is the database name, and the second term or phrase is a database table name. Example: database name is "ACCOUNTING", and database table name is "Invoice";
  (b) The relation (e.g. "has") between the first Winu or phrase ("ACCOUNTING") and the second term or phrase ("Invoice") is recognized as implicit due to the semantics of the RDB schema;
  (c) A node is produced ("Accounting—has—Invoice") by supplying the relation ("has") between the pair of concepts or terms;
  (d) For each table in the RDB, the steps (a) fixed as the database name, (b) fixed as the relation, (c) where the individual table names are iteratively used, produce a node; and (B) A second phase, where
  (a) the first term or phrase is the database table name, and the second term or phrase is the database table column name. Example: database table name is "Invoice" and column name is "Amount Due";
  (b) The relation (e.g. "has") between the first term or phrase ("Invoice") and the second term or phrase ("Amount Due") is recognized as implicit due to the semantics of the RDB schema;
  (c) A node is produced ("Invoice—has—Amount Due") by supplying the relation ("has") between the pair of concepts or terms;
  (d) For each column in the database table, the steps (a) fixed as the database table name, (b) fixed as the relation, (c) where the individual column names are iteratively used, produce a node;
  (e) For each table in the RDB, step (d) is followed, with the steps (a) where the database table names are iteratively used, (b) fixed as the relation, (c) where the individual column names are iteratively used, produce a node;

In this embodiment, the entire schema of the RDB is decomposed, and because of the implicit relationship being immediately known by the semantics of the RDB, the entire schema of the RDB can be composed into nodes without additional processing of the intermediate format pair of concepts or terms.

In another embodiment, the decomposition function takes as input the RDB schema plus at least two values from a row in the table. The method includes (a) the first term or phrase is a compound term, with
(b) the first part of the compound term being the database table column name which is the name of the "key" column of the table (for example for table "Invoice", the key column is "Invoice No"), and (c) the second part of the compound term being the value for the key column from the first row of the table (for example, for the "Invoice" table column "Invoice No." the row 1 value of "Invoice No." is "500024", the row being called the "current row",
(d) the third part of the compound is the column name of a second column in the table (example "Status"),
(e) resulting in the first term or phrase being "Invoice No. 500024 Status";
(f) the second term or phrase is the value from second column, current row Example: second column name is "Status", value of row 1 is "Overdue";
(g) The relation (e.g. "is") between the first term or phrase ("Invoice No. 500024 Status") and the second term or phrase ("Overdue") is recognized as implicit due to the semantics of the RDB schema;
(h) A node is produced ("Invoice No. 500024 Status—is—Overdue") by supplying the relation ("is") between the pair of concepts or terms;
(i) For each row in the table, the steps (b) fixed as the key column name, (c) varying with each row, (d) fixed as name of second column, (f) varying with the value in the second column for each row, with (g) the fixed relation ("is"), produces a node (h);
(j) For each column in the table, step (i) is run;
(k) For each table in the database, step (j) is run;

The entire contents of the RDB can be decomposed, and because of the implicit relationship being immediately known by the semantics of the RDB, the entire contents of the RDB can be composed into nodes without additional processing of the intermediate format pair of terms or phrases.

Where the context is a tree graph, and the resource is a taxonomy, the relation from the first term or phrase to the second term or phrase is an implicit relation, and that implicit relation is defined in a taxonomy.

The decomposition function will capture all the hierarchical relations in the taxonomy. The decomposition method is a graph traversal function, meaning that the method will visit every vertex of the taxonomy graph. In a tree graph, a vertex (except for the root) can have only one parent, but many siblings and many children. The method includes:
(a) Starting from the root vertex of the graph,
(b) visit a vertex (called the current vertex);
(c) If a child vertex to the current vertex exists;
(d) The value of the child vertex is the first term or phrase (example "mammal");
(e) The value of the current vertex is the second term or phrase (example "living organism");
(f) The relation (e.g. "is") between the first term or phrase (child vertex value) and the second term or phrase (parent vertex value) is recognized as implicit due to the semantics of the taxonomy;
(g) A node is produced ("mammal—is—living organism") by supplying the relation ("is") between the pair of concepts or terms;
(h) For each vertex in the taxonomy graph, the steps of (b), (c), (d), (e), (f), (g) are executed;

The parent/child relations of entire taxonomy tree can be decomposed, and because of the implicit relationship being immediately known by the semantics of the taxonomy, the entire contents of the taxonomy can be composed into nodes without additional processing of the intermediate format pair of concepts or terms.

In another embodiment, the decomposition function will capture all the sibling relations in the taxonomy. The method includes:
(a) Starting from the root vertex of the graph,
(b) visit a vertex (called the current vertex);
(c) If more than one child vertex to the current vertex exists;
(d) using a left-to-right frame of reference;
(e) The value of the first child vertex is the first term or phrase (example "humans");
(f) The value of the closest sibling (proximal) vertex is the second term or phrase (example "apes");
(g) The relation (e.g. "related") between the first term or phrase (first child vertex value) and the second term or phrase (other child vertex value) is recognized as implicit due to the semantics (i.e. sibling relation) of the taxonomy;
(h) A node is produced ("humans—related—apes") by supplying the relation ("related") between the pair of concepts or terms;
(i) For each other child (beyond the first child) vertex of the current vertex, the steps of (e), (f), (g), (h) are executed;
(j) For each vertex in the taxonomy graph, the steps of (b), (c), (d), (i) are executed;

All sibling relations in the entire taxonomy tree can be decomposed, and because of the implicit relationship being immediately known by the semantics of the taxonomy, the entire contents of the taxonomy can be composed into nodes without additional processing of the intermediate format pair of terms or phrases.

Where the context is a digraph, and the resource is an ontology, the relation from the first term or phrase to the second term or phrase is an explicit relation, and that explicit relation is defined in an ontology.

The decomposition function will capture all the semantic relations of semantic degree 1 in the ontology. The decomposition method is a graph traversal function, meaning that the method will visit every vertex of the ontology graph. In an ontology graph, semantic relations of degree 1 are represented by all vertices exactly 1 link ("hop") removed from any given vertex. Each link must be labeled with the relation between the vertices. The method includes:
(a) Starting from the root vertex of the graph,
(b) visit a vertex (called the current vertex);
(c) If a link from the current vertex to another vertex exists;
(d) Using a clockwise frame of reference;
(e) The value of the current vertex is the first term or phrase (example "husband");
(f) The value of the first linked vertex is the second term or phrase (example "wife");
(g) The relation (e.g. "spouse") between the first term or phrase (current vertex value) and the second term or phrase (linked vertex value) is explicitly provided due to the semantics of the ontology;
(h) A node is produced ("husband—spouse—wife") (meaning formally that "there exists a husband who has a spouse relation with a wife") by supplying the relation ("spouse") between the pair of terms or phrases;
(i) For each vertex in the taxonomy graph, the steps of (b), (c), (d), (e), (f), (g), (h) are executed;

The degree one relations of entire ontology tree can be decomposed, and because of the explicit relationship being immediately known by the labeled relation semantics of the ontology, the entire contents of the ontology can be composed into nodes without additional processing of the intermediate format pair of terms or phrases.

A node is comprised of parts. The node parts can hold data types including, but not limited to text, numbers, mathematical symbols, logical symbols, URLs, URIs, and data objects. The node data structure is sufficient to independently convey meaning, and is able to independently convey meaning because the node data structure contains a relation. The relation manifest by the node is directional, meaning that the relationships between the relata may be uni-directional or bi-directional. A uni-directional relationship exists in only a single direction, allowing a traversal from one part to another but no traversal in the reverse direction. A bi-directional relationship allows traversal in both directions.

A node is a data structure comprised of three parts in one preferred embodiment, and the three parts contain the relation and two relata. The arrangement of the parts is:
  (a) the first part contains the first relatum;
  (b) the second part contains the relation;
  (c) the third part contains the second relatum;
The naming of the parts is:
  (a) the first part, containing the first relatum, is called the subject;
  (b) the second part, containing the relation, is called the bond;
  (c) the third part, containing the second relatum, is called the attribute;

In another preferred embodiment, a node is a data structure and is comprised of four parts. The four parts contain the relation, two relata, and a source. One of the four parts is a source, and the source contains a URL or URI identifying the resource from which the node was extracted. In an alternative embodiment, the source contains a URL or URI identifying an external resource which provides a context for the relation contained in the node. In these embodiments, the four parts contain the relation, two relata, and a source, and the arrangement of the parts is:
  (a) the first part contains the first relatum;
  (b) the second part contains the relation;
  (c) the third part contains the second relatum;
  (d) the fourth part contains the source;
The naming of the parts is:
  (a) the first part, containing the first relatum, is called the subject;
  (b) the second part, containing the relation, is called the bond;
  (c) the third part, containing the second relatum, is called the attribute;
  (d) the fourth part, containing the source, is called the sequence;

The generation of nodes 180A, 180B is achieved using the products of decomposition by a natural language processor (NLP) 410, including at least one sentence of words and a sequence of tokens where the sentence and the sequence must have a one-to-one correspondence 415. All nodes 180A, 180B that match at least one syntactical pattern 420 can be constructed. The method is:
  (a) A syntactical pattern 420 of tokens is selected (example: <noun><preposition><noun>);
  (b) Moving from left to right;
  (c) The sequence of tokens is searched for the center token (<preposition>) of the pattern;
  (d) If the correct token (<preposition>) is located in the token sequence;
  (e) The <preposition> token is called the current token;
  (f) The token to the left of the current token (called the left token) is examined;
  (g) If the left token does not match the pattern,
    a. the attempt is considered a failure;
    b. searching of the sequence of tokens is continued from the current token position;
    c. until a next matching <preposition> token is located;
    d. or the end of the sequence of tokens is encountered;
  (h) if the left token does match the pattern,
  (i) the token to the right of the current token (called the right token) is examined;
  (j) If the right token does not match the pattern,
    a. the attempt is considered a failure;
    b. searching of the sequence of tokens is continued from the current token position;
    c. until a next matching <preposition> token is located;
    d. or the end of the sequence of tokens is encountered;
  (k) if the right token matches the pattern,
  (l) a node 180A, 180B is created;
  (m) using the words from the word list that correspond to the <noun><preposition><noun> pattern, example "action regarding inflation";
  (n) searching of the sequence of tokens is continued from the current token position;
  (o) until a next matching <preposition> token is located;
  (p) or the end of the sequence of tokens is encountered;
Steps (a)-(l) represent an example of a per pattern token seeking behavior constraint 375n of FIG. 3.

The generation of nodes is achieved using the products of decomposition by a natural language processor (NIT), including at least one sentence of words and a sequence of tokens where the sentence and the sequence must have a one-to-one correspondence. All nodes that match at least one syntactical pattern can be constructed. The method is:
  (q) A syntactical pattern of tokens is selected (example: <noun><preposition><noun>);
  (r) Moving from left to right;
  (s) The sequence of tokens is searched for the center token (<preposition>) of the pattern;
  (t) If the correct token (<preposition>) is located in the token sequence;
  (u) The <preposition> token is called the current token;
  (v) The token to the left of the current token (called the left token) is examined;
  (w) If the left token does not match the pattern,
    a. the attempt is considered a failure;
    b. searching of the sequence of tokens is continued from the current token position;
    c. until a next matching <preposition> token is located;
    d. or the end of the sequence of tokens is encountered;
  (x) if the left token does match the pattern,
  (y) the token to the right of the current token (called the right token) is examined;
  (z) If the right token does not match the pattern,
    a. the attempt is considered a failure;
    b. searching of the sequence of tokens is continued from the current token position;
    c. until a next matching <preposition> token is located;
    d. or the end of the sequence of tokens is encountered;
  (aa) if the right token matches the pattern,
  (bb) a node is created;
  (cc) using the words from the word list that correspond to the <noun><preposition><noun> pattern, example "prince among men";
  (dd) searching of the sequence of tokens is continued from the current token position;
  (ee) until a next matching <preposition> token is located;
  (ff) or the end of the sequence of tokens is encountered;
Steps (r)-(bb) represent another example of a per pattern token seeking behavior constraint 375 of FIG. 3.

The per pattern token seeking behavior constraints are not necessarily those normally associated with the semantic patterns of a language.

A preferred embodiment of the present invention is directed to the generation of nodes using all sentences which are products of decomposition of a resource. The method includes an inserted step (q) which executes steps (a) through (p) for all sentences generated by the decomposition function of an NLP.

Nodes can be constructed using more than one pattern. The method is:
(1) The inserted step (a1) is preparation of a list of patterns. Such a list of patterns is shown at item 370 of FIG. 3. This list can start with two patterns and extend to essentially all patterns usable in making a node, and include but are not limited to:
  (i)<noun><verb><noun> example: "man bites dog",
  (ii)<noun><adverb><verb> example: "horse quickly runs",
  (iii)<verb><adjective><noun> example: "join big company",
  (iv)<adjective><noun><noun> example: "silent night song",
  (v)<noun><preposition><noun> example: "voters around country";
(2) The inserted step (p1) where steps (a) through (p) are executed for each pattern in the list of patterns;

In an improved approach, nodes are constructed using more than one pattern, and the method for constructing nodes uses a sorted list of patterns. In this embodiment,
  The inserted step (a2) sorts the list of patterns by the center token, then left token then right token (example: <adjective> before <noun> before <preposition>), meaning that the search order for the set of patterns (i) through (v) would become (iii)(ii)(iv)(v)(i), and that patterns with the same center token would become a group.
  (b)(c) Each sequence of tokens is searched for the first center token in the pattern list i.e. <adjective>
  (d) If the correct token (<adjective>) is located in the token sequence;
  (e) The located <adjective> token is called the current token;
  (e1) Using the current token,
  (e2) Each pattern in the list with the same center token (i.e. each member of the group in the pattern list) is compared to the right token, current token, and left token in the sequence at the point of the current token;
  (e3) For each group in the search list, steps (b) through (e2) are executed;
  (q) steps (b) through (e3) are executed for all sentences decomposed from the resource;

Additional interesting nodes can be extracted from a sequence of tokens using patterns of only two tokens. The method searches for the right token in the patterns, and the bond value of constructed nodes is supplied by the node constructor. In another variation, the bond value is determined by testing the singular or plural form of the subject (corresponding to the left token) value. In this embodiment,
  (a) The pattern is <noun><adjective>;
  (b) Moving from left to right;
  (c) The sequence of tokens is searched for the token <adjective>;
  (d) If the correct token (<adjective>) is located in the token sequence;
  (e) The <adjective> token is called the current token;
  (f) The token to the left of the current token (called the left token) is examined;
  (g) If the left token does not match the pattern (<noun>),
    a. the attempt is considered a failure;
    b. searching of the sequence of tokens is continued from the current token position;
    c. until a next matching <adjective> token is located;
    d. or the end of the sequence of tokens is encountered;
  (h) if the left token does match the pattern,
  (i) a node is created;
  (j) using the words from the word list that correspond to the <noun><adjective> pattern, example "mountain big";
  (k) the subject value of the node (corresponding to the <noun> position in the pattern) is tested for singular or plural form
  (l) a bond value for the node is inserted based upon the test (example "is" "are")
  (m) resulting in the node "mountain is big"
  (n) searching of the sequence of tokens is continued from the current token position;
  (o) until a next matching <adjective> token is located;
  (p) or the end of the sequence of tokens is encountered;
  (q) steps (a) through (p) are executed for all sentences decomposed from the resource;

Using a specific pattern of three tokens, the method for constructing nodes searches for the left token in the patterns, the bond value of constructed nodes is supplied by the node constructor, and the bond value is determined by testing the singular or plural form of the subject (corresponding to the left token) value. In this embodiment,
  (a) The pattern is <adjective><noun><noun>;
  (b) Moving from left to right;
  (c) The sequence of tokens is searched for the token <adjective>;
  (d) If the correct token (<adjective>) is located in the token sequence;
  (e) The <adjective> token is called the current token;
  (f) The token to the right of the current token (called the center token) is examined;
  (g) If the center token does not match the pattern (<noun>),
    a. the attempt is considered a failure;
    b. searching of the sequence of tokens is continued from the current token position;
    c. until a next matching <adjective> token is located;
    d. or the end of the sequence of tokens is encountered;
  (h) if the center token does match the pattern,
  (i) The token to the right of the center token (called the right token) is examined;
  (j) If the right token does not match the pattern (<noun>),
    a. the attempt is considered a failure;
    b. searching of the sequence of tokens is continued from the current token position;
    c. until a next matching <adjective> token is located;
    d. or the end of the sequence of tokens is encountered;
  (k) if the center token does match the pattern,
  (l) a node is created;
  (m) using the words from the word list that correspond to the <adjective><noun><noun> pattern, example "silent night song";
  (n) the attribute value of the node (corresponding to the right token <noun> position in the pattern) is tested for singular or plural form
  (o) a bond value for the node is inserted based upon the test (example "is" "are")
  (p) resulting in the node "silent night is song"
  (q) searching of the sequence of tokens is continued from the current token position;
  (r) until a next matching <adjective> token is located;
  (s) or the end of the sequence of tokens is encountered;

(t) steps (a) through (s) are executed for all sentences decomposed from the resource;

Nodes are constructed using patterns where the left token is promoted to a left pattern containing two or more tokens, the center token is promoted to a center pattern containing no more than two tokens, and the right token is promoted to a right pattern containing two or more tokens. By promoting left, center, and right tokens to patterns, more complex and sophisticated nodes can be generated. In this embodiment, the NLP's use of the token "TO" to represent the literal "to" can be exploited. For example, (i)<adjective><noun> <verb> <adjective><noun> "large contributions fight world hunger", (ii)<noun> <TO><verb> <noun> "legislature to consider bill", (iii)<noun> <adverb><verb> <adjective><noun> "people quickly read local news"

For example, using <noun> <TO><verb> <noun> "legislature to consider bill", (a) Separate lists of patterns for left pattern, center pattern, and right pattern are created and referenced;
(b) The leftmost token from the center pattern is used as the search
(c) If the correct token (<TO>) is located in the token sequence;
(d) The <TO> token is called the current token;
(e) The token to the right of the current token (called the right token in the context of the center patterns) is examined;
(f) If the token does not match any center pattern right token,
  a. the attempt is considered a failure;
  b. searching of the sequence of tokens is continued from the current token position;
  c. until a next matching <TO> token is located;
  d. or the end of the sequence of tokens is encountered;
(g) if the right token does match the pattern of the center pattern (<TO><verb>),
(h) the token to the left of the current token (called the right token in the context of the left patterns) is examined;
(i) If the right token does not match any left pattern right token,
  a. the attempt is considered a failure;
  b. searching of the sequence of tokens is continued from the current token position;
  c. until a next matching <TO> token is located;
  d. or the end of the sequence of tokens is encountered;
(j) if the right token matches the pattern,
(k) The token to the right of the current token (called the right token in the context of the center patterns) becomes the current token;
(l) The token to the right of the current token (called the left token in the context of the right patterns) is examined;
(m) If the token does not match any right pattern left token,
  a. the attempt is considered a failure;
  b. searching of the sequence of tokens is continued from the current token position;
  c. until a next matching <TO> token is located;
  d. or the end of the sequence of tokens is encountered;
(n) if the left token does match the pattern of the right pattern (<noun>),
(o) a node is created;
(p) using the words from the word list that correspond to the <noun> <TO><verb> <noun> "legislature to consider bill",
(q) searching of the sequence of tokens is continued from the current token position;
(r) until a next matching <preposition> token is located;
(s) or the end of the sequence of tokens is encountered.

Post Generation Node Filters

Under certain conditions, it is desirable to filter out certain possible node constructions. Those filters include, but are not limited to:

(i) All words in subject, bond, and attribute are capitalized;
(ii) Subject, bond, or attribute start or end with a hyphen or an apostrophe;
(iii) Subject, bond, or attribute have a hyphen plus space ("- ") or space plus hyphen (" -") or hyphen plus hyphen ("--") embedded in any of their respective values;
(iv) Subject, bond, or attribute contain sequences greater than length three (3) of the same character (ex: "FFFF");
(v) Subject, bond, or attribute contain a multi-word value where the first word or the last word of the multi-word value is only a single character (ex: "a big");
(vi) Subject and attribute are singular or plural forms of each other;
(vii) Subject and attribute are identical or have each other's value embedded (ex:
"dog" "sees" "big dog");
(viii) Subject, bond, or attribute respectively contain two identical words (ex:
"Texas Texas" "is" "state");

Where the nodes are comprised of four parts, the fourth part contains a URL or URI of the resource from which the node was extracted. In this embodiment, in addition to the sentence (sequence of words and corresponding sequence of tokens), the URL or URI from which the sentence was extracted is passed to the node generation function. For every node created from the sentence by the node generation function, the URL or URI is loaded into the fourth part, called the Sequence 186, of the node data structure.

Where the four part nodes are generated using the RDB decomposition function, the RDB decomposition function will place in the fourth (sequence) part of the node the URL or URI of the RDB resource from which the node was extracted, typically, the URL by which the RDB decomposition function itself created a connection to the database. An example using the Java language Enterprise version, using a well known RDBMS called MySQL and a database called "mydb": "jdbc:mysql://localhost/mydb". If the RDBMS is a Microsoft Access database, the URL might be the file path, for example: "c:\anydatabase.mdb". This embodiment is constrained to those RDBMS implementations where the URL for the RDB is accessible to the RDB decomposition function. Note that the URL of a database resource is usually not sufficient to programmatically access the resource.

Figure 4:
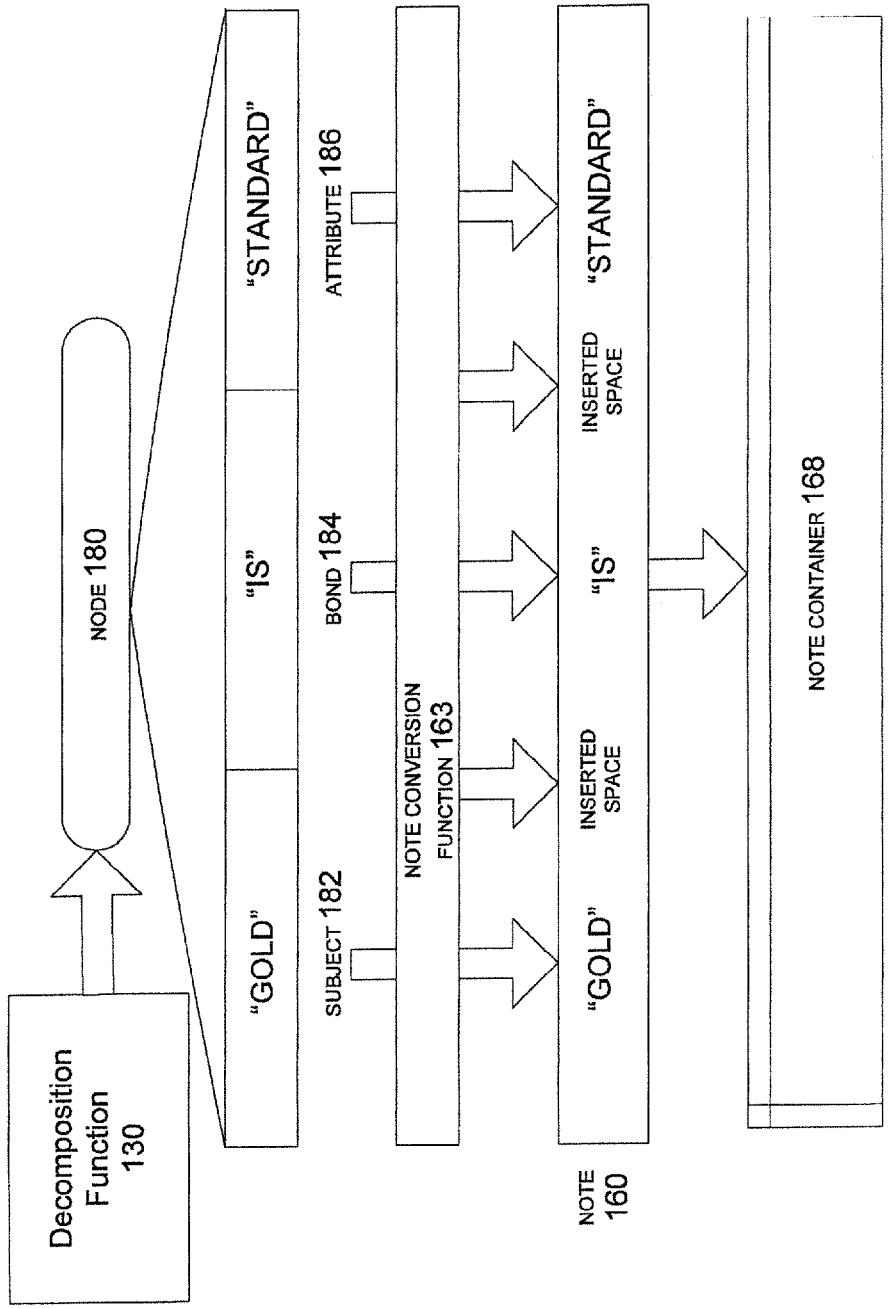
FIG. 4 illustrates that operation of the node to note conversion function of FIG. 1 in accordance with one aspect of the invention.

FIG. 4 illustrates the operation of the node to note conversion function of FIG. 1 in accordance with one aspect of the invention. The Note Conversion Function 163 is simply illustrated in FIG. 4. The products of the Decomposition Function 130 are Nodes 180. An example Node 180 is given. The example Node 180 is composed of three parts. The first part of the example Node 180 is a Subject 182, which contains the value "GOLD". The second part of the example Node 180 is a Bond 184, which contains the value "IS". The third part of the example Node 180 is an Attribute 186, which contains the value "STANDARD". The Note Conversion Function extracts the value from the Subject 182 ("GOLD"), converts it to text if the value is not already in text form, and places the text in the leftmost position of the Note 160, which is, in this embodiment a text data object. The Note Conversion Program 163 then concatenates a space character to the current rightmost character of the Note 160 text value. The Note Conversion Function then extracts the value from the Bond 184 ("IS"), converts it to text if the value is not already in text form, and places the text in the leftmost position of the Note 160. The Note Conversion Program 163 then concatenates a space character to the current rightmost character of the Note 160 text value. The Note Conversion Function then extracts the value from the Attribute 186 ("STANDARD"), converts it to text if the value is not already in text form, and places the text in the leftmost position of the Note 160. The Conversion 163 of the Node 180 into a Note 160 is then complete, and the Note 160 is placed in the Note Container 168.

Figure 5:
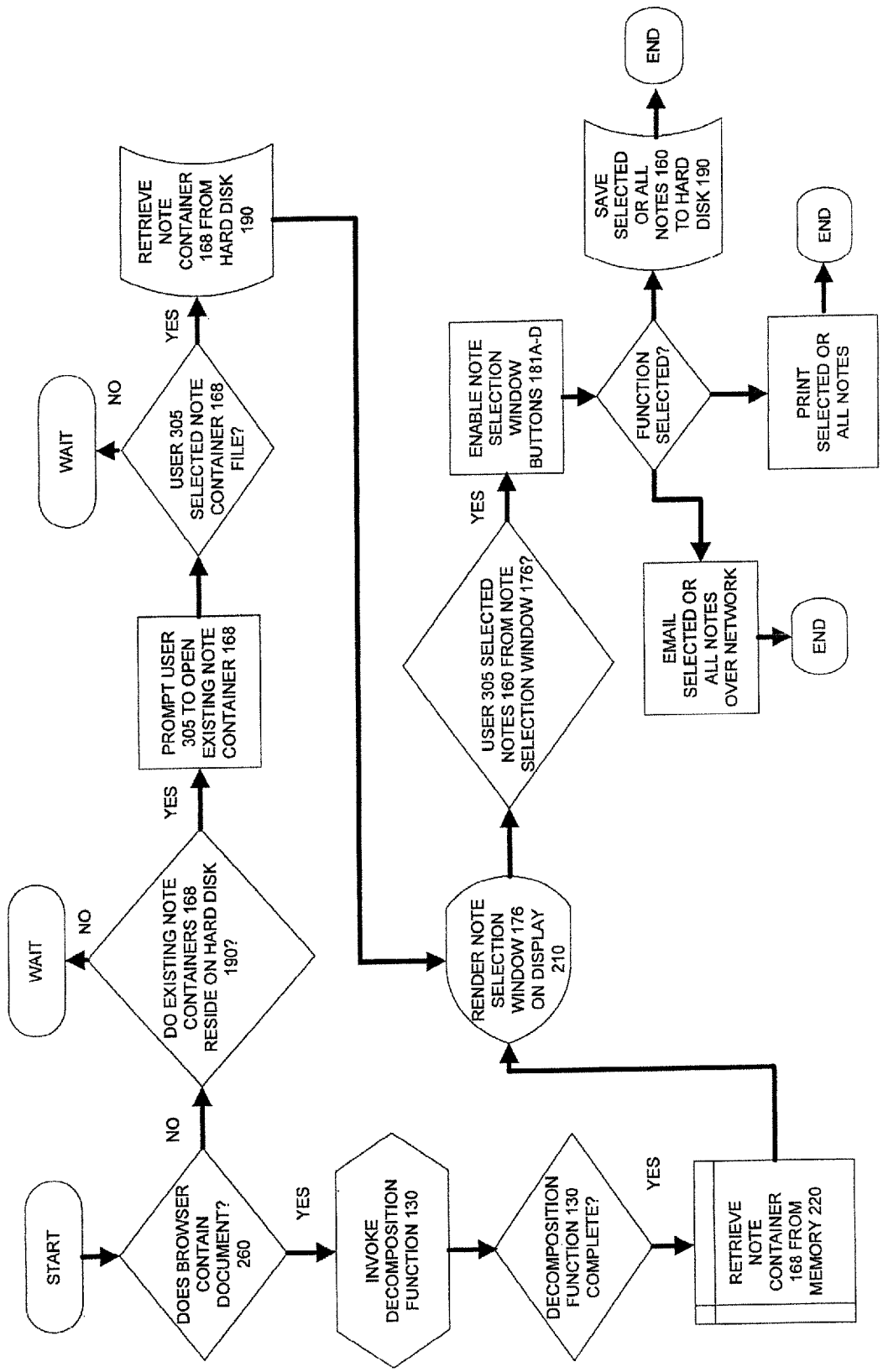
FIG. 5 is a flow chart of the note-taking program in accordance with one aspect of the invention.

FIG. 5 is a flow chart of the functionality of Note Taking Program 170. In one embodiment, a User 305 clicks on the Notes Icon 410 to Start. The Note Taking Program 170 will first check that a Document 260 is displayed in the Program 270 e.g., an Internet Browser program. If a Document 260 is in fact displayed, the Note Taking Program 170 will invoke the Document Decomposition Function 130. As is illustrated in FIG. 3, the Decomposition Function 130 will create Nodes 180, from which the Note Conversion Function 163 will create Notes 160. Referring again to FIG. 5, the Note Conversion Function 163 will then place in Memory 220 a Note Container 168 with all Notes 160 that have been created. The Note Taking Function 170 will fetch the Note Container 168 from Memory 220, render a Note Selection Window 176 on the Display 210, render the Controls 181 on the Display 210, and populate the Note Selection Window 176 with Notes 160 rendered for display. Then the Note Taking Program 170 will enable all Controls 181 which bind to all Notes (as opposed to Selected Notes). When the User 305 selects on of the enabled functions and activates the Control 181, the Note Taking Program 170 executes the selected function and Ends. Alternately, if the User 305 selects Notes 160 from the Note Selection Window 176, the Note Taking Program 170 will enable the Controls 181 that operate on selected Notes only. Alternatively, if there is no Document 260 displayed by the Program 270, the Note Taking Program 270 will check the default directory on Hard Disk 190 for extant Note Container 168 files. If such files exist, the Note Taking Program will prompt the User 305 to select a Note Container 168 file. The Note Taking Program will retrieve the Note Container 168 from Hard Disk 190 and render the Note Selection Window 176, the Controls 181, and the Notes 160 on the Display 210 for further interactive interface with the User 305.

Figure 6:
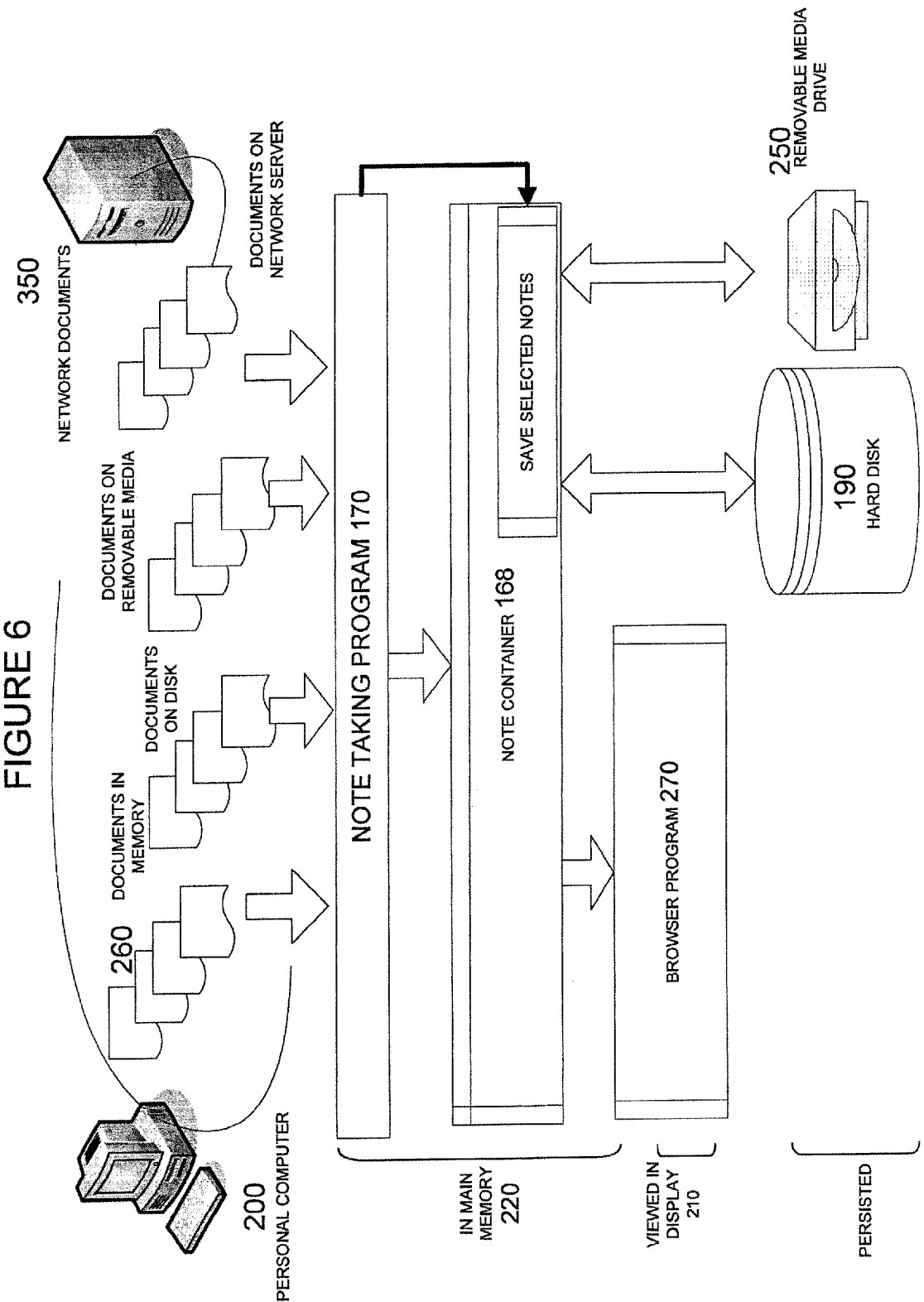
FIG. 6 illustrates a software architecture preferably used for the computer generation of notes.

FIG. 6 illustrates a software architecture preferable used for the computer generation of notes. FIG. 6 is a representation of how Documents 260, whether residing on a Personal Computer 200, in Personal Computer Memory 220, on Personal Computer Hard Disk 190, on Personal Computer Removable Media 250 or on a Network Server 350, can be presented to a User 305 using the present invention. Also shown are the components of the Personal Computer 200 used in the process, including Main Memory 220, Display 210, Hard Disk 190, and Removable Media Drive 250. Finally, the use of Hard Disk 190 and Removable Media to permanently store (persist) the Notes 160 contained in the Note Container 168 is illustrated.

Figure 7:
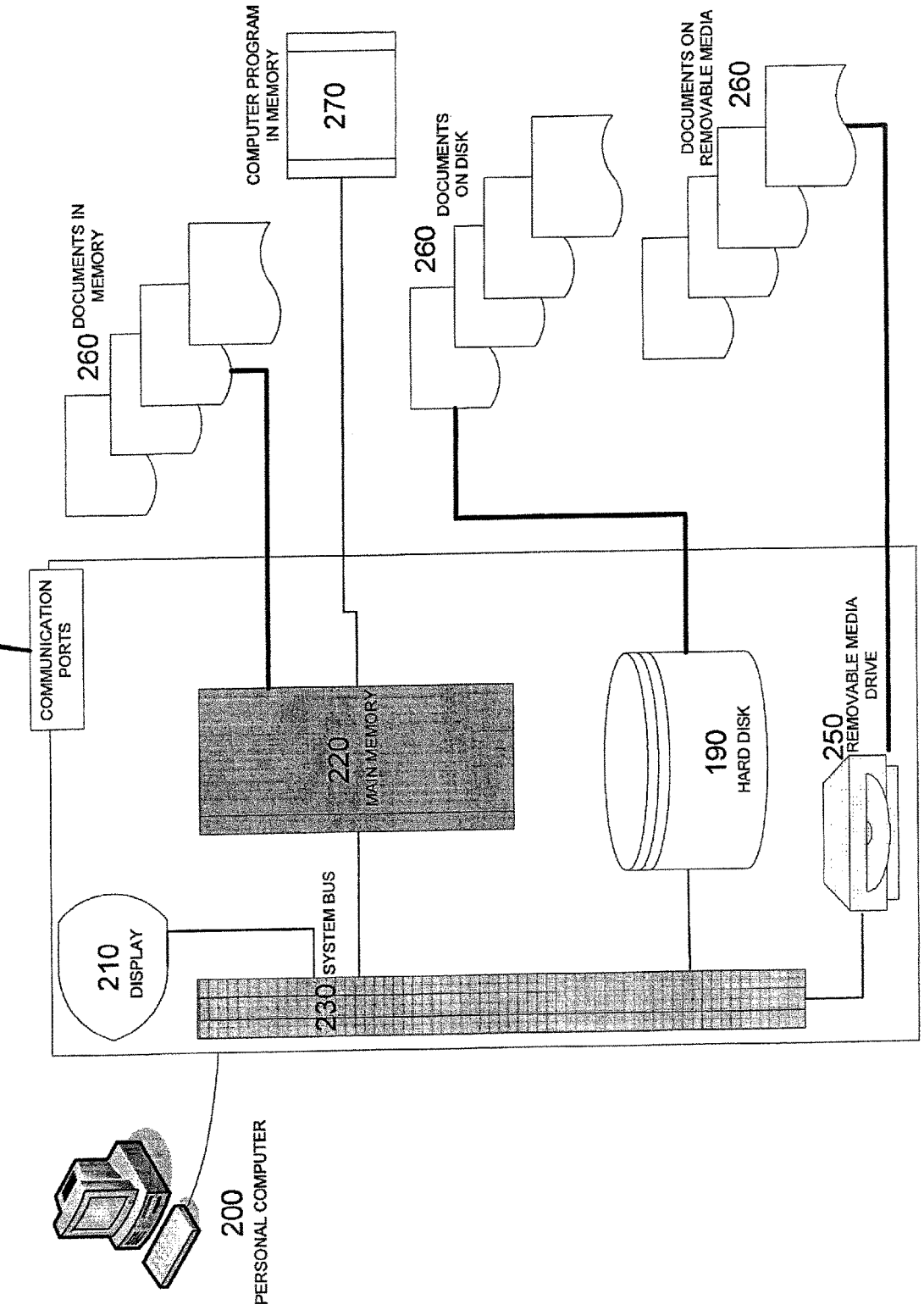
FIG. 7 is a block diagram of a hardware architecture of an exemplary personal computer used in carrying out the invention.

FIG. 7 is a block diagram of a hardware architecture of a personal computer used in carrying out the invention. FIG. 7 is an illustration of the internal components of a typical laptop or desktop personal computer 700. Programs 770 and data are stored on Hard Disk 190 or Removable Media Drive 750, and are placed into Main Memory 720 via the System Bus 730. User interface and results are rendered on the Display 710. Documents 760 may be stored on Hard Disk 190 or Removable Media read by a Removable Media Drive 750, and placed in Main Memory where the Documents 760 and their content can be manipulated by Computer Program 770, of which one embodiment of the present invention is an example, as is an Internet Browser such as Internet Explorer, a product of Microsoft, Inc.

Figure 8:
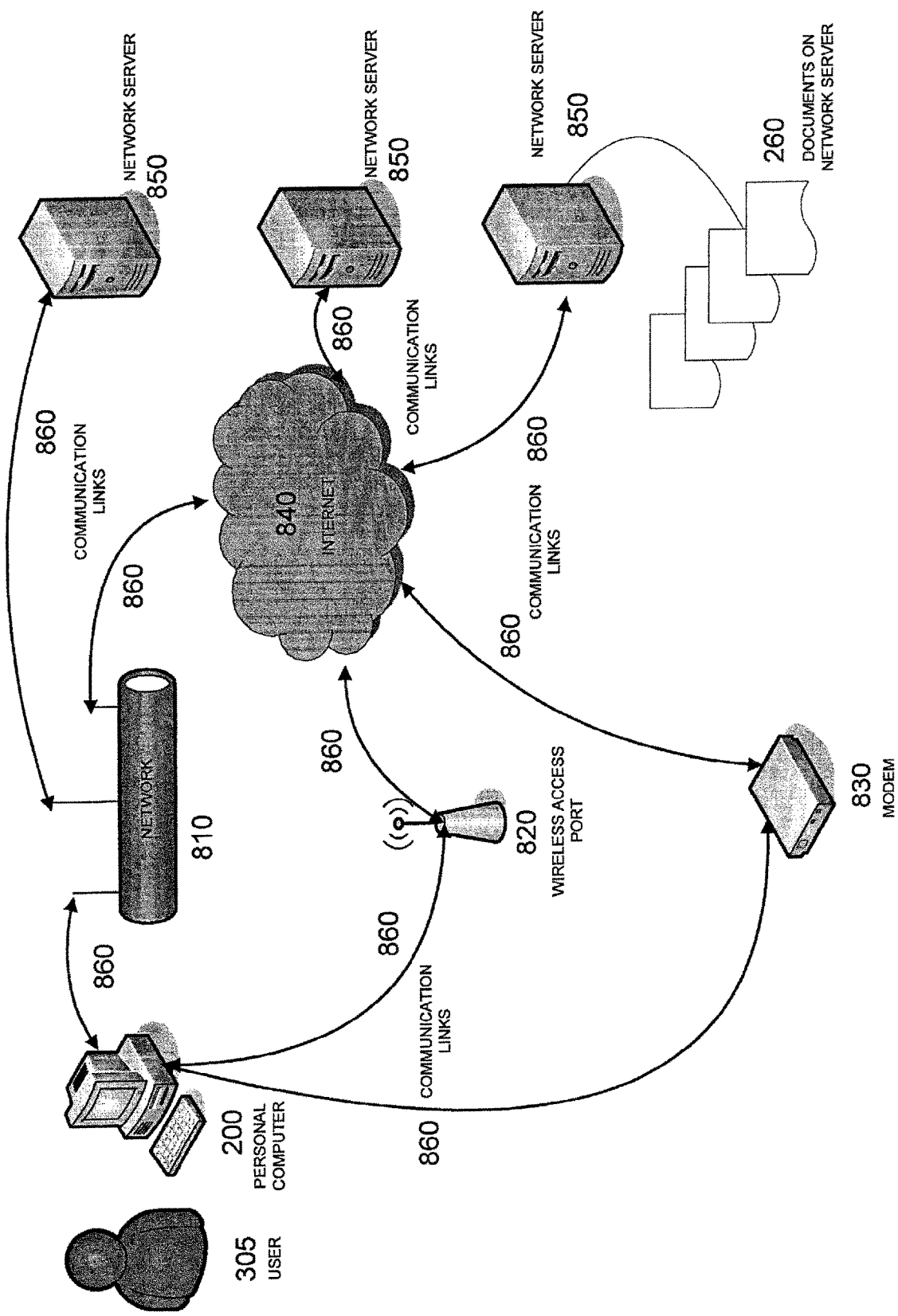
FIG. 8 is a block diagram showing use of the note taking functionality in a network environment.

FIG. 8 is a block diagram showing use of the note taking functionality in a networked environment. FIG. 8 is an illustration of a Personal Computer 700 connected to Network Servers 850. The connections are through Communication Links 860. The types of connections that can be made include connection via a Broadband Network 810, which can directly connect to a Network Server 850 or can connect to a Network Server 850 through the Internet 840. Alternatively, a Personal Computer 700 can be connected to a Network Server 850 via Wireless Access 820 to the Internet 840. Also illustrated is connection of a Personal Computer 700 to a Network Server 850 via dial-up Modem 830 access to the Internet 840. Documents 760 can be stored on a Network Server 850. Upon request by a User 805 using a Software Program 770 operating on a Personal Computer 700, Documents 760 can be retrieved from a Network Server 850 and transmitted over Communication Links 860 to the Personal Computer 700 for use in Software Program 770 such as that which is one embodiment of the present invention.

FIG. 9 is an illustration of an exemplary screen view of a notes selection window and related control buttons in accordance with one aspect of the invention.

A note selection window 176 is shown associated with two save buttons 181A and 181B. If it is desirable only to save certain notes from the note selection window, those notes will be selected, using, typically, standard operating system functionality followed by selection of the save selection button 181A. When button 181A is activated, the items that were identified for saving are stored on a hard disk, for example hard disk 190 using the save function 182 of FIG. 1. If it is desirable to save all of the notes that have been generated, the save all button, 181B can be selected.

In one embodiment, associated with FIG. 10A, the Nodes 180B generated by the Document Decomposition Function 130 are composed of four parts, the fourth part of such Nodes 180B containing bibliographic information. With reference to FIG. 1C of Ser. No. 11/273,568, the fourth part of such Nodes 180B is referred to as a Sequence or Source 188. The type of bibliographic information that may be captured in the fourth part of such Nodes 180B will vary depending upon the application programming interfaces (API) extent for each type of Document 260 and each type of Computer Program 270 used to display the Document 260. At minimum, the bibliographic information captured in the fourth part of said Node 180B will include the URL or URI of the Document 260. In other embodiments, the title, author, publication date of the Document 260 may be captured in the fourth part of said Node 180B. In further embodiments, the chapter, page, paragraph or line of the Document 260 where the text which served as the basis for creation of the Node 180B will be captured in the fourth part of said Node 180B. As previously described herein and in Ser. No. 11/273,568 and Ser. No. 11/314,835, Nodes 180 which are acquired from a Document 260 by the Document Decomposition Function 130 are not clipped or cut and pasted from the text of a Document 260. Rather, Nodes 180 may be said to be associated with a location in the text of a Document 260, that location being the location in the text corresponding to the location in the Sentence+Token Sequence Pair 760 where the first token of a Pattern 770 was found by the Constraint 775 as it operated upon the Sentence+Token Sequence Pair 760 and was successfully able to complete the generation of a Node 180. Where the type of Document 260 and Computer Program 270 permit, that location will be captured in the fourth, Sequence 188 part of the Node 180B. Referring to FIG. 10A, note 160B made from a four-part Node 180B is composed of two parts, a Note Content part 161, and a Note Source part 162. In one embodiment, in addition to the Note Content 161, the bibliographic material in the Note Source 162 also can be displayed in the Note Selection Window 176, and subsequently printed or emailed.

As noted above, there is specific exception to the conformity of Notes 160 constructed by the current invention to notes constructed by hand and ad hoc by a human reviewer of the same Document 260. That exception is for quotations—that is, text passages found in Documents 260 delimited by a single pair of complementary quotation marks.

In the case of quotations, where strictly accurate representation of a written or spoken text is required, one embodiment the current invention excludes quotations found in text from the default Tagger 740 algorithm. Instead, the Tagger 740 will, when encountering either an open or a close quotation marks character, utilize a created part of speech token, "QS" for a open quotation and "QT" for a closed quotation, to delimit the quotation in the Token Sequence. Subsequently, the Node Generation Function 780, when processing the Sentence+Token Sequence Pair 760 will use a special Constraint 775 when a "QS" token is encountered. The Constraint 775 will then seek the following complementary closed quotation mark "QT" token. All text referenced by tokens between the complementary quotation tokens is moved into a temporary memory buffer. If no closed quotation mark token is found, no further special action will be taken by the Node Generation Function 780. If a complementary closed quotation token is found, the Node Generation Function 780 will construct a two part Quotation Node 1010, as shown in FIG. 10B, the Quotation Node 1010 having a first part called the Quote 1013 and the Quotation Node 1010 having a second part called the Sequence or Source 1088. The Quote 1013 part of the Quotation Node 1010 holds the entire quoted text and the Sequence 1088 part holding bibliographic information. For a Note 160B made from a Quotation Node 1010, the entire quoted text will be placed in the Note Content 161, and the available bibliographic information will be placed in the Note Source 162.

In another embodiment, the User 305 can elect to not respect quotations, in which case quoted text will be processed by the Tagger 740 and the Node Generation Function 780, as is other text in the Document 260. In one embodiment, the User 305, can elect to respect quotations, but not to preserve quotations in Quotation Nodes 1010. Using this method, when a open quotation token is encountered by the Node Generation Function 780 quotation token delimited words and tokens from the Sentence+Token Sequence Pair 760 will be processed into Nodes 180 by the Node Generation Function 780 independently of the other words and tokens in the Sentence+Token Sequence Pair 760.

While various embodiments of the present invention have been illustrated herein in detail, it should be apparent that modifications and adaptations to those embodiments may occur to those skilled in the art without departing from the scope of the present invention.

The invention claimed is:

1. An apparatus for generating notes of content from an information resource system, the apparatus comprising:
a processor, a computer readable memory and a computer-readable storage medium;
program instructions stored on the computer-readable storage medium, the program instructions executable by the processor to cause the processor to:
receive an information resource associated with the information resource system;
decompose the information resource using an intermediate format by pairing a first relatum with a second relatum based on a relation between the first relatum and the second relatum, the relation being defined by a context provided by a structure of the information resource;
generate a node based on the decomposing, the node being a data structure including the first relatum, the relation between the first relatum and the second relatum, and the second relatum;
extract a note from the generated node, the note being a text object;
store the note;
receive a user selection of one or more of a plurality of stored notes from a note selection window; and
execute a computer-based instruction involving the one or more of the plurality of stored notes based on the user selection.

2. The apparatus of claim 1, wherein the decomposing the information resource is based on a resource that uses the intermediate format.

3. The apparatus of claim 2, wherein the intermediate format represents a data structure identifying relationships and relata, the intermediate format comprises a subject paired with an attribute, and a bond between the subject and the attribute.

4. The apparatus of claim 1, wherein:
the context is either implicit or explicit; and
the decomposing further comprises determining the relation between the first relatum and the second relatum.

5. The apparatus of claim 1, wherein the context includes at least one of:
a schema;
a tree graph;
a directed graph; and
a semi-structured data model.

6. The apparatus of claim 5, wherein the relation is further defined and determined based on a type of the information resource.

7. The apparatus of claim 5, wherein the type of information resource comprises at least one of:
an ontology;
a taxonomy;
a relational database; and
a semi-structured data object.

8. The apparatus of claim 1, wherein the node comprises a subject, an attribute, and a bond between the subject and the attribute.

9. The apparatus of claim 1, wherein the computer-based instruction comprises at least one of:
transmitting the one or more notes via a computer network;
displaying additional details regarding the one or more notes;

printing the one or more notes; and
saving the one or more notes to persistent or removeable storage.

10. The apparatus of claim 1, further comprising:
a decomposition element for decomposing the information resource and generating nodes; and
a note conversion element for extracting notes from the generated nodes.

11. The apparatus of claim 10, wherein the note conversion element uses a special constraint for extracting the notes based on a determination that the notes include a special character string.

12. The apparatus of claim 11, wherein the special character string includes a quotation character.

13. A computer-implemented method for generating notes of content from an information resource system, the method comprising:
receiving, by a computing device, an information resource associated with the information resource system;
decomposing, by the computing device, the information resource, wherein the information resource uses an intermediate format, the decomposing comprising:
pairing a first relatum with a related second relatum, and
determining a relation between the first relatum with the second relatum based on a context provided by a structure of the information resource;
generating, by the computing device, a node based on the decomposing and the determined relation, the node being a data structure including the first relatum, the determined relation between the first relatum and the second relatum, and the second relatum;
extracting, by the computing device, a note from the generated node, the note being a text object;
storing, by the computing device, the note;
receiving, by the computing device, a user selection of one or more of a plurality of stored notes from a note selection window; and
executing, by the computing device, a computer-based instruction involving the one or more of the plurality of stored notes based on the user selection.

14. The computer-implemented method of claim 13, wherein the determining the relation between the first relatum with the second relatum is further based on a type of the information resource.

15. The computer-implemented method of claim 14, wherein the context includes at least one of:
a schema;
a tree graph;
a directed graph; and
a semi-structured data model.

16. The computer-implemented method of claim 15, wherein the type of information resource comprises at least one of:
an ontology;
a taxonomy;
a relational database; and
a semi-structured data object.

17. The computer-implemented method of claim 16, wherein the relation is further defined and determined based on a type of the information resource.

18. The computer-implemented method of claim 13, wherein the node comprises a subject, an attribute, and a bond between the subject and the attribute.

19. The computer-implemented method of claim 13, wherein the decomposing is performed by a decomposition element, and the extracting is performed by a note conversion element, wherein the note conversion element uses a special constraint for extracting notes based on a determination that the notes include a special character string.

20. A computer program product comprising at least one non-transitory computer readable storage medium having program instructions embodied therewith, the program instructions executable by a computing device to cause the computing device to:
receive an information resource associated with an information resource system, wherein the information resource includes a data structure;
decompose the information resource based on word classification to produce each respective word of a sentence, and assign to the each respective word of the sentence a respective token corresponding to a part of speech of the respective word to produce a sequence of tokens for the sentence;
generate a node based on the decomposing, the generating of the node comprising:
selecting a syntactical pattern of tokens,
searching the sequence of tokens for the sentence for a token matching a center token of the selected syntactical pattern of tokens,
in response to finding the matching token in the searched sequence of tokens:
making the matching token a current token, and
in response to determining that a token left of the current token matches the pattern of the selected syntactical pattern of tokens and a token right of the current token matches the pattern of the selected syntactical pattern of tokens:
generating the node including the words corresponding to the sequence of tokens for the sentence that match the selected syntactical pattern of tokens;
extract a note from the generated node;
store the note;
receive a user selection of one or more of a plurality of stored notes from a note selection window; and
execute a computer-based instruction involving the one or more of the plurality of stored notes based on the user selection.

* * * * *